United States Patent [19]

Oeynhausen et al.

[11] Patent Number: 4,946,011
[45] Date of Patent: Aug. 7, 1990

[54] SHAFT-TURNING DEVICE WITH HYDRO-MECHANICAL OVERRUNNING CLUTCH

[75] Inventors: Heinrich Oeynhausen, Ruhr; Ernst Winkelhake, Bochum, both of Fed. Rep. of Germany

[73] Assignee: Siemens Aktiengesellschaft, Munich, Fed. Rep. of Germany

[21] Appl. No.: 220,000

[22] Filed: Jul. 15, 1988

[30] Foreign Application Priority Data

Jul. 15, 1987 [DE] Fed. Rep. of Germany ....... 3723385

[51] Int. Cl.$^5$ ..................... F16D 25/065; F16D 43/28
[52] U.S. Cl. ................. 192/0.096; 192/85 AT; 192/76; 192/1.13 B; 60/435
[58] Field of Search ............... 192/41 R, 85 AT, 0.96, 192/76, 107 M, 107 R, 113 B; 60/435, 436

[56] References Cited

U.S. PATENT DOCUMENTS

| | | | |
|---|---|---|---|
| 563,989 | 7/1896 | Storey | 192/85 AT |
| 1,985,291 | 12/1934 | Hodges | 192/85 AT |
| 2,333,682 | 11/1943 | Schneider | 192/85 AT |
| 2,538,997 | 1/1951 | Weiland | 192/85 AT |
| 2,935,889 | 5/1960 | Adams et al. | 192/113 B |
| 3,563,352 | 2/1971 | Stibbe | 60/435 X |
| 3,675,112 | 7/1972 | Smith | 60/435 X |
| 3,726,801 | 4/1973 | Sterner et al. | 60/435 X |
| 3,998,052 | 12/1976 | Easter | 60/413 |
| 4,037,409 | 7/1977 | Leibach | 60/435 |
| 4,211,070 | 7/1980 | Portmann | 60/39.08 |
| 4,598,545 | 7/1986 | Harada | 60/435 |
| 4,648,495 | 3/1987 | Vater et al. | 142/113 B |
| 4,729,463 | 3/1988 | Ranislau et al. | 192/76 |

FOREIGN PATENT DOCUMENTS

| | | |
|---|---|---|
| 1683733 | 9/1954 | Fed. Rep. of Germany . |
| 1297622 | 10/1969 | Fed. Rep. of Germany . |
| 1956178 | 11/1974 | Fed. Rep. of Germany . |
| 2732036 | 8/1985 | Fed. Rep. of Germany . |
| 3641004 | 8/1987 | Fed. Rep. of Germany . |
| 654781 | 6/1951 | United Kingdom . |

Primary Examiner—Rodney H. Bonck
Assistant Examiner—Nicholas Whitelaw
Attorney, Agent, or Firm—Herbert L. Lerner; Laurence A. Greenberg

[57] ABSTRACT

A shaft-turning device includes a driving element in the form of a hydraulic motor having a first pressure fluid inflow line, and an element for connection with a shaft to be turned in the form of a clutch having a second pressure fluid inflow line communicating with the first pressure fluid inflow line. The clutch includes locking elements being hydraulically forced counter to a spring force.

16 Claims, 2 Drawing Sheets

SHAFT-TURNING DEVICE WITH HYDRO-MECHANICAL OVERRUNNING CLUTCH

BACKGROUND OF THE INVENTION

1. Field of the Invention

The invention relates to a shaft-turning device having an overrunning clutch, especially for turbo-machines, including a hydraulic motor as a driving element and a clutch as an element for connection with a shaft to be turned.

2. Description of the Related Art

Shaft-turning devices of this kind are known, for instance, from German Published, Prosecuted Patent Application DE-AS 19 56 178 or German Patent DE-PS 27 32 036. In the shaft-turning devices of the prior art, mechanical overrunning clutches are generally provided. If incorrectly serviced and under various possible operating conditions, such clutches are subjected to a certain amount of wear and attention must be paid to mechanical properties during the operation thereof.

SUMMARY OF THE INVENTION

It is accordingly an object of the invention to provide a shaft-turning device with a hydro-mechanical overrunning clutch, which overcomes the hereinafore-mentioned disadvantages of the heretofore-known devices of this general type, which is triggerable as simply as possible and in which the overrunning clutch is subjected to the least possible amount of wear, so that even incorrect servicing or inaccuracies in centering, for example, do not lead to premature destruction. The shaft-turning device should enable start-up, steady slow rotation, and the interception of a shaft at higher rotational speed. The term "interception" is understood in this context to mean that as the shaft is coming to stop below a certain rotational speed, the shaft-turning device assumes the further rotation.

With the foregoing and other objects in view there is provided, in accordance with the invention, a shaft-turning device, especially for turbo-machines, comprising a driving element in the form of a hydraulic motor having a first pressure fluid inflow line, and an element for connection with a shaft to be turned in the form of a clutch having a second pressure fluid inflow line communicating with the first pressure fluid inflow line, the clutch including spring means, force-locking elements, and means for hydraulically forcing the locking elements counter to the force of the spring means.

Due to the locking, force-locking or friction-locking elements that are movable hydraulically counter to a spring force, the function of the clutch can be adapted very much better to various requirements than is possible with mechanical devices that typically cannot be controlled from outside. Since the clutch and the hydraulic motor are supplied with pressure fluid in common, the effort for controlling the various operating states is minimal. A force-locking connection is one which connects two elements together by force external to the elements, as opposed to a form-locking connection which is provided by the shapes of the elements themselves.

In accordance with another feature of the invention, the force-locking elements are movable between a position of repose in which the clutch is disengaged and a position actuated by pressure fluid in which the clutch is engaged.

In accordance with a further feature of the invention, the clutch includes a cup-shaped outer ring and an inner ring concentrically disposed in the outer ring, the locking elements are in the form of at least two and preferably four or five radial pistons disposed in the inner ring, and the hydraulic forcing means lock the inner ring to the outer ring with the radial pistons upon actuation with pressure fluid.

In accordance with an added feature of the invention, the outer ring is connected to the shaft to be turned, and the hydraulic motor has a drive shaft connected to the inner ring.

As in other overrunning clutches, the outer ring and inner ring are connected with the two shafts to be coupled.

In accordance with an additional feature of the invention, the radial pistons have inner ends in the form of pressure pistons, and the hydraulic forcing means include pressure fluid conduits supplying pressure fluid to the pressure pistons. The pressure fluid may be supplied from outside by means of a hydraulic oil duct, into the rotating parts having the further pressure fluid conduits, so that triggering of the clutch from the outside is possible.

In accordance with yet another feature of the invention, the spring means are in the form of cup springs, and the radial pistons are movable outward counter to the pressure of the cup springs.

In accordance with yet a further feature of the invention, the radial pistons and the outer ring are formed of paired materials being frictionally interconnected in a locking condition and sliding in an overrunning condition of the clutch.

In accordance with yet an added feature of the invention, the material of the piston is bronze and the material of the outer ring is steel.

In accordance with yet an additional feature of the invention, the radial pistons have outer surfaces, and there are provided linings disposed on the outer surfaces, the linings and said outer ring being frictionally interconnected in a locking condition and sliding in an overrunning condition of the clutch.

In accordance with still another feature of the invention, the radial piston has an outer surface with a sharp oil-stripping edge on the front thereof and a rounded edge on the back thereof, as viewed in the rotational direction.

In accordance with still a further feature of the invention, the outer ring has an inner surface, and the pistons are spaced from the inner ring or from an abutment of the inner ring defining gaps therebetween through which a fluid, preferably oil, emerges lubricating the inner surface of the outer ring.

Aside from the structure of the overrunning clutch itself, a particularly significant feature is the cooperation thereof with the hydraulic motor. In other words, the hydraulic circuit for operating a shaft-turning device according to the invention is particularly important.

Therefore, in accordance with still an added feature of the invention, there is provided a common preferably adjustable throttle connecting the hydraulic motor and the hydraulic clutch to the same hydraulic oil supply.

In accordance with still an additional feature of the invention, there is provided a hydraulic oil inflow line connected between the hydraulic motor and the clutch, and delay valve means disposed in the hydraulic oil inflow line for releasing an inflow to the hydraulic motor only beyond a predetermined minimum pressure but continuing to remain open at a lower pressure.

In accordance with again another feature of the invention, the hydraulic motor has a hydraulic oil outlet, and there is provided a throttle disposed in the hydraulic oil outlet.

In accordance with again a further feature of the invention, the spring means are in the form of cup springs, and there are provided means for adjusting oil pressure downstream of the common throttle upon start-up in accordance with the viscosity of the pressure fluid and the structure of the pressure pistons and the cup springs, causing the radial pistons to establish a friction-locking connection with the outer ring no later than the start-up of the hydraulic motor, the connection being disconnected in an overrunning condition as soon as the hydraulic motor begins to operate passively as a pump and pressure in the pressure oil inflow line drops.

In accordance with a concomitant feature of the invention, there are provided means for adjusting oil pressure downstream of the common throttle upon interception of the shaft causing the radial pistons to initially engage slidingly until attainment of a predeterminable threshold rpm and to brake the hydraulic motor if the rpm drops below the threshold rpm, which increases the pressure in the hydraulic oil inflow lines and establishes a friction-locking connection between the radial pistons and the outer ring.

These features make the method for operating such shaft-turning devices particularly simple, because once the device is correctly adjusted, only very few operating steps need to be taken into account, in order to perform all necessary functions.

Other features which are considered as characteristic for the invention are set forth in the appended claims.

Although the invention is illustrated and described herein as embodied in a shaft-turning device with hydro-mechanical overrunning clutch, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
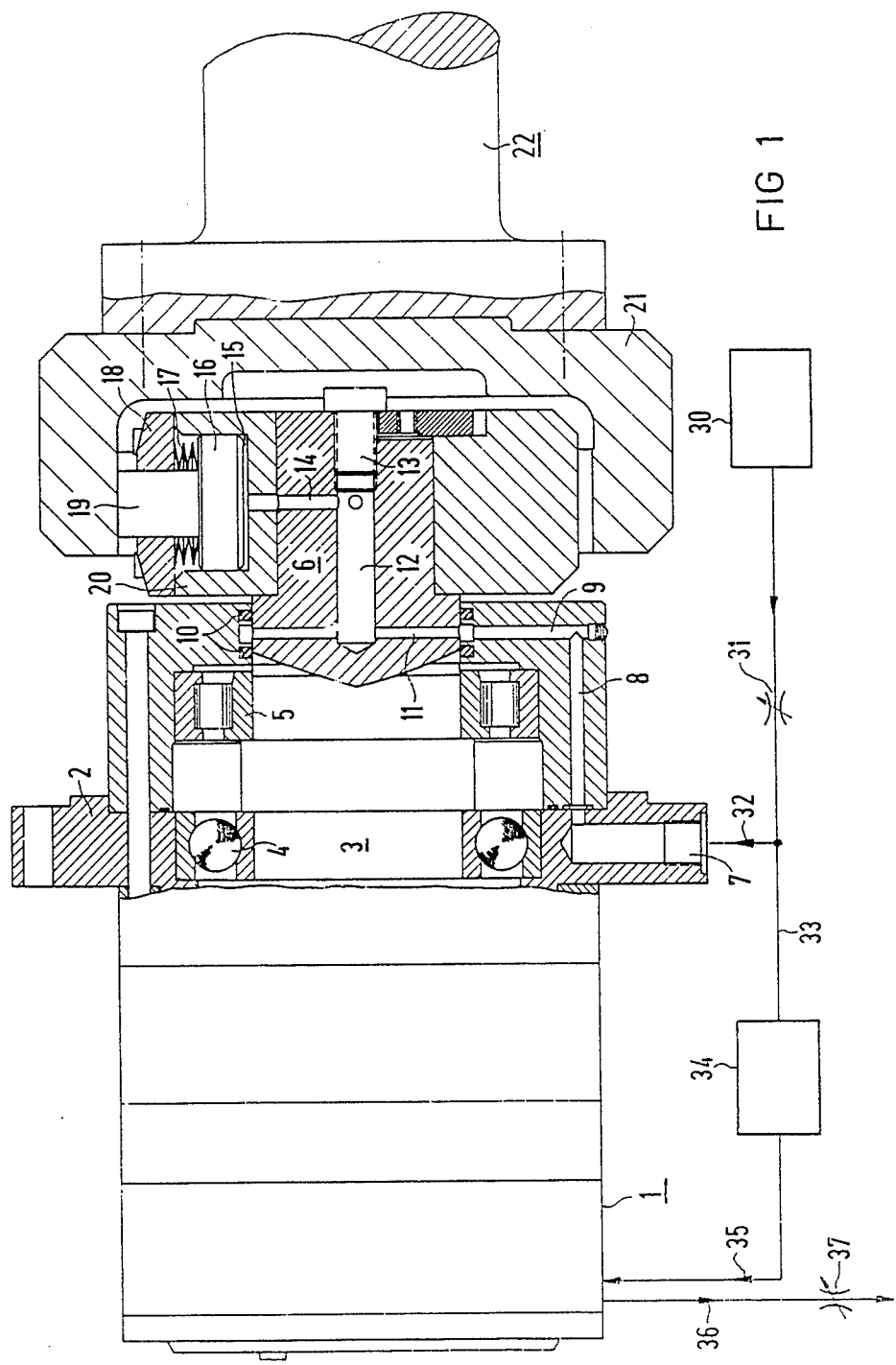
FIG. 1 is a fragmentary, diagrammatic, side-elevational view of a shaft-turning device according to the invention which is partly broken-away into a longitudinal section, with a schematic circuit diagram of a hydraulic circuit associated therewith.

Referring now to the figures of the drawings in detail and first, particularly, to FIG. 1 thereof, there is seen a conventional hydraulic motor 1 which is shown without further details. According to the invention, a reinforced driving shaft 3 is retained in shaft bearings 4, 5 by means of a securing flange 2. The driving shaft 3 merges with or changes over into a hollow shaft 6, on which an inner ring 20 of the overrunning clutch is secured. A hydraulic oil inlet integrated into the securing flange 2, communicates with hydraulic oil conduits 8, 9, which carry the hydraulic oil to a hydraulic oil duct 10 having a packing therein. At the hydraulic oil duct 10, the oil is carried from a stationary housing of the device into the rotating hollow shaft 6, where it passes through hydraulic oil conduits 11 to reach a central bore 12. The central bore 12 is provided with a closure stopper 13. The hydraulic oil also flows through radial bores 14 into pressure cylinder chambers 15 toward the inside of pressure pistons 16. The outsides of the pressure pistons 16 are supported by cup springs 17 against an abutment 18. Upon the supply of hydraulic oil, the pressure pistons 16 and therefore radial pistons 19 are pressed outward counter to the pressure of the cup springs 17.

Figure 2:
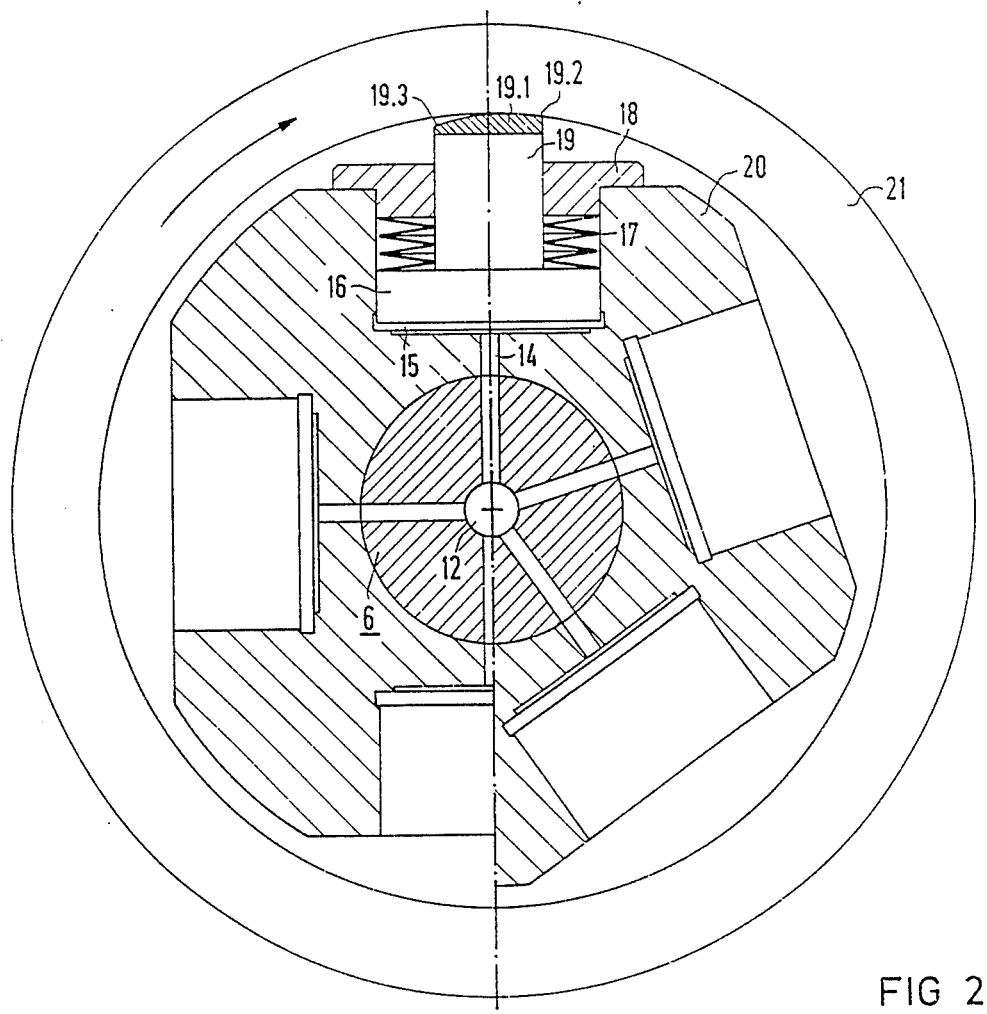
FIG. 2 is a cross-sectional view taken through the overrunning clutch in the plane of the radial pistons.

As seen in FIG. 2, the outer ends of the radial pistons 19 may have a friction lining 19.1, which is shaped in such a way that it has a sharp oil-stripping edge 19.2 at the front and a rounded edge 19.3 at the back, as viewed in the rotational direction. The pressure pistons 16 and radial pistons 19 may also all be made in one piece from some suitable friction material, such as bronze. Upon actuation with hydraulic oil, the radial pistons 19 are pressed against the inside of an outer ring 21, which in turn is connected with a machine shaft 22 to be driven. Oil emerging from the gaps between the radial pistons 19 and the abutment 18 lubricates the inside of the outer ring with a film of oil, which can be rapidly broken by the oil-stripping edge 19.2 upon start-up of the device. On the other hand, the rounded piston side 19.3 has the effect of causing the radial pistons 19 to float on the oil film in the overrunning situation, even if the overrunning clutch does not immediately become free of pressure. Even if the apparatus is operated improperly, it is especially possible to avoid severe wear of the pistons 19 or friction linings 19.1 if a pairing of materials is selected that also has good sliding properties, such as is the case with bronze and steel, for instance. The pistons 16, 19 are inserted with sufficient play, because of the desired emergence of oil.

As is diagrammatically shown in FIG. 2, the number of radial pistons that will be disposed in the inner ring 20 depends on the dimensions of the overrunning clutch and other structural considerations. FIG. 2 shows the placement of four or five radial pistons in the inner ring 20, as a suggestion.

FIG. 1 diagrammatically illustrates the hydraulic circuit for operation of the overrunning clutch according to the invention, which is substantially intended for functioning in various operating states. Both the overrunning clutch and the hydraulic motor are supplied with high-pressure oil through respective inflow lines 32, 33 and 35 and a common adjustable throttle 31, from a high-pressure oil system 30. As is discussed in further detail below, for certain applications it may be necessary to provide a delay valve 34 as well. Furthermore, it is advantageous to provide an adjustable throttle 37 downstream of the hydraulic oil outlet 36 from the hydraulic motor.

In order to provide a further explanation of the substance of the invention, the function of the shaft-turning device will be described briefly below:

After the supply of oil is switched on, the hydraulic motor begins turning before the radial pistons of the clutch are pressed outward, because the restoring springs of the pistons are typically selected with a higher response pressure than the motor. The result is a brief slippage, until the pistons are pressed firmly enough against the outer ring to brake the motor once again and be able to establish a friction-locking connection. This slippage has no disadvantageous consequences due to a suitable pairing of materials, such as pistons of bronze and outer rings of steel, and due to lubricating the inside of the outer ring. The oil-stripping edge of the radial piston reinforces the rapid movement of the oil film until a friction-locking connection is established. The shaft-turning device then accelerates the shaft until the desired rpm which is adjustable with the common throttle in the inflow, has been attained.

Since the precise functioning of the components that are to be adapted to one another depends on the viscosity of the oil used and on the temperature thereof, it is possible during start-up with cold and therefore viscous oil that the pistons may not press the oil film through to the outer ring fast enough and therefore they may hydrodynamically float. The hydraulic motor then increases its rpm and friction-locking is no longer possible, because the pressure at the hydraulic oil inflow of the clutch drops again as a result of the rapidly increasing flow rate in the hydraulic motor. In the event that such an operating situation is to be taken into account, a delay valve can be incorporated into the inflow of the hydraulic motor. A valve of this kind must be allowed to permit the flow through to the motor only after having once established a pressure at which the radial pistons of the clutch are already pressed outward. The holding pressure of the delay valve, that is, the pressure up to which the valve remains open, must, however, be markedly lower than the opening pressure, so that the other functions of the shaft-turning device are not disadvantageously affected.

Once the rotated turbo-machine starts up, the hydraulic motor is relieved to an increasing extent and finally is carried along by the clutch. In this case, the hydraulic motor shifts from active operation to passive operation, in which it operates as a quasi-pump. As a consequence of the increasing oil throughput in the hydraulic motor, the pressure upstream of the motor and therefore at the inlet of the clutch drops to such an extent that the radial pistons slip and disconnect the connection. In the interplay between the restoring spring force and the pressure upstream of the motor and clutch, a stable state is achieved, at which the pistons slide on the outer ring with only slight pressing forces. In order to attain precisely this state, the throttle in the outlet of the hydraulic motor is adjusted precisely in such a way that the pressure upstream of the motor and clutch in the overrunning situation does not drop below the response pressure of the restoring springs. Upon a further increase of the turbo-machine rpm and sufficient inflow of oil, the radial pistons can float hydrodynamically on the oil film on the inside of the outer ring, which is favored by the rounded side of the piston. Even if the turning device is not shut off immediately, premature wear of the friction lining or piston and outer ring need not be feared. With correct adjustment of the throttle in the outflow, the pressure downstream of the hydraulic motor is slightly greater than upstream of the motor, because the sliding clutch transmits a slight frictional moment, and the hydraulic motor thus continues to operate as a pump.

When the turbo-machine is coming to a stop, the shaft-turning device is switched on once the rpm drops below a certain predetermined level. If this threshold rpm is located above the intended rpm of the shaft-turning device, then the above-described state of overrunning at the clutch automatically ensues. If the machine rpm then drops below the rpm of the shaft-turning device, then the hydraulic motor is braked through the clutch, the throughput of oil drops, and the pressure upstream of the motor and clutch increases, so that the shaft-turning device gradually assumes the driving of the shaft. If the switching on of the shaft-turning device takes place at a threshold rpm below the intended rpm of the shaft-turning device, the result is a process which is similar to starting up from a standstill.

Once the adjustable throttles have all been initially adjusted in accordance with the dimensions of all of the component parts, maintenance of the shaft-turning device according to the invention is restricted to switching it on and off, and even a delayed switching off only slightly increases wear.

We claim:

1. Shaft-turning device, comprising a hydraulic motor having a first pressure fluid inflow line, a hydraulic overrunning clutch for connection with a shaft to be turned having a second pressure fluid inflow line constantly communicating with said first pressure fluid inflow line during operation, said clutch including spring means, locking elements, and means for hydraulically forcing said locking elements counter to the force of said spring means, a hydraulic oil supply, a common supply line communicating with said hydraulic oil supply and both of said inflow lines, and a throttle in said common supply line.

2. Shaft-turning device according to claim 1, wherein said clutch includes a cup-shaped outer ring and an inner ring concentrically disposed in said outer ring, said locking elements are in the form of at least two radial pistons disposed in said inner ring, and said hydraulic forcing means lock said inner ring to said outer ring with said radial pistons upon actuation with pressure fluid.

3. Shaft-turning device according to claim 2, wherein said outer ring is connected to the shaft to be turned, and said hydraulic motor has a drive shaft connected to said inner ring.

4. Shaft-turning device according to claim 2, wherein said radial pistons have inner ends that are pressure pistons, and said hydraulic forcing means include pressure fluid conduits supplying pressure fluid to said pressure pistons.

5. Shaft-turning device according to claim 2, wherein said spring means are cup springs, and said radial pistons are movable outward counter to the pressure of said cup springs.

6. Shaft-turning device according to claim 2, wherein said radial pistons and said outer ring are formed of paired materials being frictionally interconnected in a locking condition and sliding in an overrunning condition of said clutch.

7. Shaft-turning device according to claim 6, wherein said material of said piston is bronze and said material of said outer ring is steel.

8. Shaft-turning device according to claim 2, wherein said radial pistons have outer surfaces, and the shaft-turning device includes linings disposed on said outer surfaces, said linings and said outer ring being frictionally interconnected in a locking condition and sliding in an overrunning condition of said clutch.

9. Shaft-turning device according to claim 2, wherein said outer ring has an inner surface, and said pistons are spaced from said inner ring defining gaps therebetween through which a fluid emerges lubricating said inner surface of said outer ring.

10. Shaft-turning device according to claim 2, wherein said outer ring has an inner surface, said inner ring has an abutment, and said pistons are spaced from said abutment defining gaps therebetween through which a lubricating fluid emerges lubricating said inner surface of said outer ring.

11. Shaft-turning device according to claim 1, wherein said clutch includes an outer ring, said locking elements are radial pistons having inner ends in the form of pressure pistons, and said spring means are that are cup springs, and said throttle is adjustable for adjusting oil pressure downstream of said throttle upon start-up in accordance with the viscosity of the pressure fluid and the structure of said pressure pistons and said cup springs, causing said radial pistons to establish a friction-locking connection with said outer ring no later than the start-up of said hydraulic motor, said connection being disconnected in an overrunning condition as soon as said hydraulic motor begins to operate passively as a pump and pressure in said pressure oil inflow line drops.

12. Shaft-turning device, comprising a hydraulic motor having a first pressure fluid inflow line, a hydraulic overrunning clutch for connection with a shaft to be turned having a second pressure fluid inflow line constantly communicating with said first pressure fluid inflow line during operation, said clutch including spring means, locking elements, and means for hydraulically forcing said locking elements counter to the force of said spring means, a hydraulic oil supply, and a common supply line communicating with said hydraulic oil supply and both of said inflow lines, said clutch including a ring to which said locking elements are frictionally locked when said hydraulic motor operates actively as a driving element, and said frictional locking being at least reduced in an overrunning condition as soon as said hydraulic motor begins to operate passively as a pump so that pressure in said pressure inflow lines drop.

13. Shaft-turning device according to claim 12, wherein said locking elements are movable between a position of repose in which said clutch is disengaged and a position actuated by pressure fluid in which said clutch is engaged.

14. Shaft-turning device, comprising a hydraulic motor having a first pressure fluid inflow line, a hydraulic overrunning clutch for connection with a shaft to be turned having a second pressure fluid inflow line constantly communicating with said first pressure fluid inflow line during operation, said clutch including spring means, locking elements, and means for hydraulically forcing said locking elements counter to the force of said spring means, a hydraulic oil supply, and a common supply line communicating with said hydraulic oil supply and both of said inflow lines, said clutch including a cup-shaped outer ring and an inner ring concentrically disposed in said outer ring, said locking elements being in the form of at least two radial pistons disposed in said inner ring, said hydraulic forcing means locking said inner ring to said outer ring with said radial pistons upon actuation with pressure fluid, and said radial piston having an outer surface with a sharp oil-stripping edge on the front thereof and a rounded edge on the back thereof, as viewed in the rotational direction.

15. Shaft-turning device, comprising a hydraulic motor having a first pressure fluid inflow line, a hydraulic overrunning clutch for connection with a shaft to be turned having a second pressure fluid inflow line constantly communicating with said first pressure fluid inflow line during operation, said clutch including spring means, locking elements, and means for hydraulically forcing said locking elements counter to the force of said spring means, a hydraulic oil supply, a common supply line communicating with said hydraulic oil supply and both of said inflow lines, a hydraulic oil inflow line connected to said first and second inflow lines, and delay valve means disposed in said hydraulic oil inflow line for releasing an inflow to said hydraulic motor only beyond a predetermined minimum pressure but continuing to remain open at a lower pressure.

16. Shaft-turning device, comprising a hydraulic motor having a first pressure fluid inflow line and a hydraulic oil outlet, a throttle disposed in said hydraulic oil outlet, a hydraulic overrunning clutch for connection with a shaft to be turned having a second pressure fluid inflow line constantly communicating with said first pressure fluid inflow line during operation, said clutch including spring means, locking elements, and means for hydraulically forcing said locking elements counter to the force of said spring means, a hydraulic oil supply, and a common supply line communicating with said hydraulic oil supply and both of said inflow lines, said clutch including an outer ring, said locking means being in the form of radial pistons having inner ends in the form of pressure pistons, and said throttle being adjustable for adjusting oil pressure in said second inflow line upon engagement of the shaft causing said radial pistons to initially engage slidingly until attainment of a predeterminable threshold rpm and to brake said hydraulic motor if the rpm drops below said threshold rpm, which increases the pressure in said hydraulic oil inflow lines and establishes a friction-locking connection between said radial pistons and said outer ring.

* * * * *